United States Patent [19]

Kii et al.

[11] Patent Number: 5,131,676

[45] Date of Patent: Jul. 21, 1992

[54] SUSPENSION CONTROL SYSTEM WITH MONITORING OF INERTIA FORCE WITH HIGH PRECISION

[75] Inventors: Katsuya Kii, Nara; Yuji Okuyama; Kazuo Mori, both of Tochigi, all of Japan

[73] Assignee: Nissan Motor Company, Limited, Japan

[21] Appl. No.: 575,768

[22] Filed: Aug. 31, 1990

[30] Foreign Application Priority Data

Sep. 4, 1989 [JP] Japan .................... 1-228808

[51] Int. Cl.⁵ ............................ B60G 17/015
[52] U.S. Cl. .................. 280/707; 364/424.05; 364/572
[58] Field of Search ............. 280/707, 689, 772; 364/424.05, 572

[56] References Cited

U.S. PATENT DOCUMENTS 4,852,906  8/1989  Buma ................... 280/DIG. 1

FOREIGN PATENT DOCUMENTS

| 0249209 | 6/1987 | European Pat. Off. . |
| 0249227 | 6/1987 | European Pat. Off. . |
| 0285153 | 3/1988 | European Pat. Off. . |
| 0286072 | 4/1988 | European Pat. Off. . |
| 63-130418 | 2/1988 | Japan . |

Primary Examiner—Charles A. Marmor
Assistant Examiner—Karin Tyson
Attorney, Agent, or Firm—Lowe, Price, LeBlanc & Becker

[57] ABSTRACT

A suspension control system employs an acceleration sensor for monitoring an inertial force affecting for vehicular attitude. A control system coacting therewith includes a mechanism for lowering the level of an output signal of the acceleration sensor to eliminate therefrom any error corresponding a resonance frequency of the acceleration sensor for obtaining higher accuracy inertially indicative data.

7 Claims, 4 Drawing Sheets

5,131,676

SUSPENSION CONTROL SYSTEM WITH MONITORING OF INERTIA FORCE WITH HIGH PRECISION

BACKGROUND OF THE INVENTION

1. Field of the Invention

The present invention relates generally to a suspension control system which is particularly applicable for an active suspension system for performing height regulation and vehicular attitude regulation based on preselected suspension control parameters. More specifically, the invention relates to a system for of monitoring an inertia force a experienced by vehicular body as a control parameter, with high precision, for permitting high precision control of the suspension system.

2. Description of the Background Art

The Japanese Patent First (unexamined) Publication (Tokkai) Showa 63-130418 discloses an active suspension system. In this prior proposed system, lateral, longitudinal and vertical acceleration sensors are employed for monitoring inertia forces exerted on the vehicular body, which inertia forces may affect vehicular attitude to cause rolling, pitching, bouncing and so forth. The system performs suspension control for adjusting damping characteristics of respective suspension systems, each of which are disposed between a vehicular body and associated one of road wheel for damping relative displacement therebetween.

Though such an active suspension system is generally successful in regulating vehicular height and vehicular attitude, a problem is encountered by resonance frequency range of the acceleration sensor employed for deriving suspension control signals. The acceleration sensors employed for monitoring inertia force have a resonance frequency range, for example at approximately 38 Hz. The peak of resonance in such case is about 30 Hz. Therefore, when the input vibration due to road surface undulation and so forth have a frequency in the vicinity of the resonance frequency range, the acceleration sensor output may become greater than that should be. The acceleration data containing error component may make the suspension control inaccurate for causing degradation of vehicular riding comfort and/or vehicular driving stability.

SUMMARY OF THE INVENTION

Therefore, it is an object of the present invention to provide a suspension control system which can avoid the influence of resonance frequency of an inertia force sensor and thus can provide higher accuracy in overall vibration frequency range for higher accuracy control.

In order to accomplish the aforementioned and other objects, a suspension control system, according to the present invention, employs an acceleration sensor for monitoring inertia force affecting for vehicular attitude. A control system includes means for lowering level of an output signal of the acceleration sensor at a resonance frequency for obtaining higher accuracy inertia force indicative data.

According to one aspect of the invention, a suspension control system for an automotive vehicle comprises:

a plurality of suspension systems, each respectively disposed between a vehicular body and a road wheel for damping a relative displacement between the vehicular body and each respective road wheel, the suspension system having variable suspension characteristics depending upon a respective suspension control command;

a sensor means for monitoring inertial force causing a vehicular attitude change on the vehicular body, to provide a sensor signal representative of the monitored magnitude of the inertial force;

first means for modifying a value of the sensor signal for eliminating an error component induced therein by a resonance frequency of the sensor means, to provide a modified sensor signal excluding the error component; and second means for receiving the modified sensor signal from the first means for deriving a suspension control command on the basis of the sensor signal modified by the first means.

The sensor monitors acceleration exerted on the vehicular body. In such case, the first means may averages the sensor signals over a predetermined period for deriving the modified sensor signal. The averaging period preferably corresponds one cycle of resonance frequency.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments but are for explanation and understanding only.

In the drawings.

DESCRIPTION OF THE PREFERRED EMBODIMENT

Figure 1:
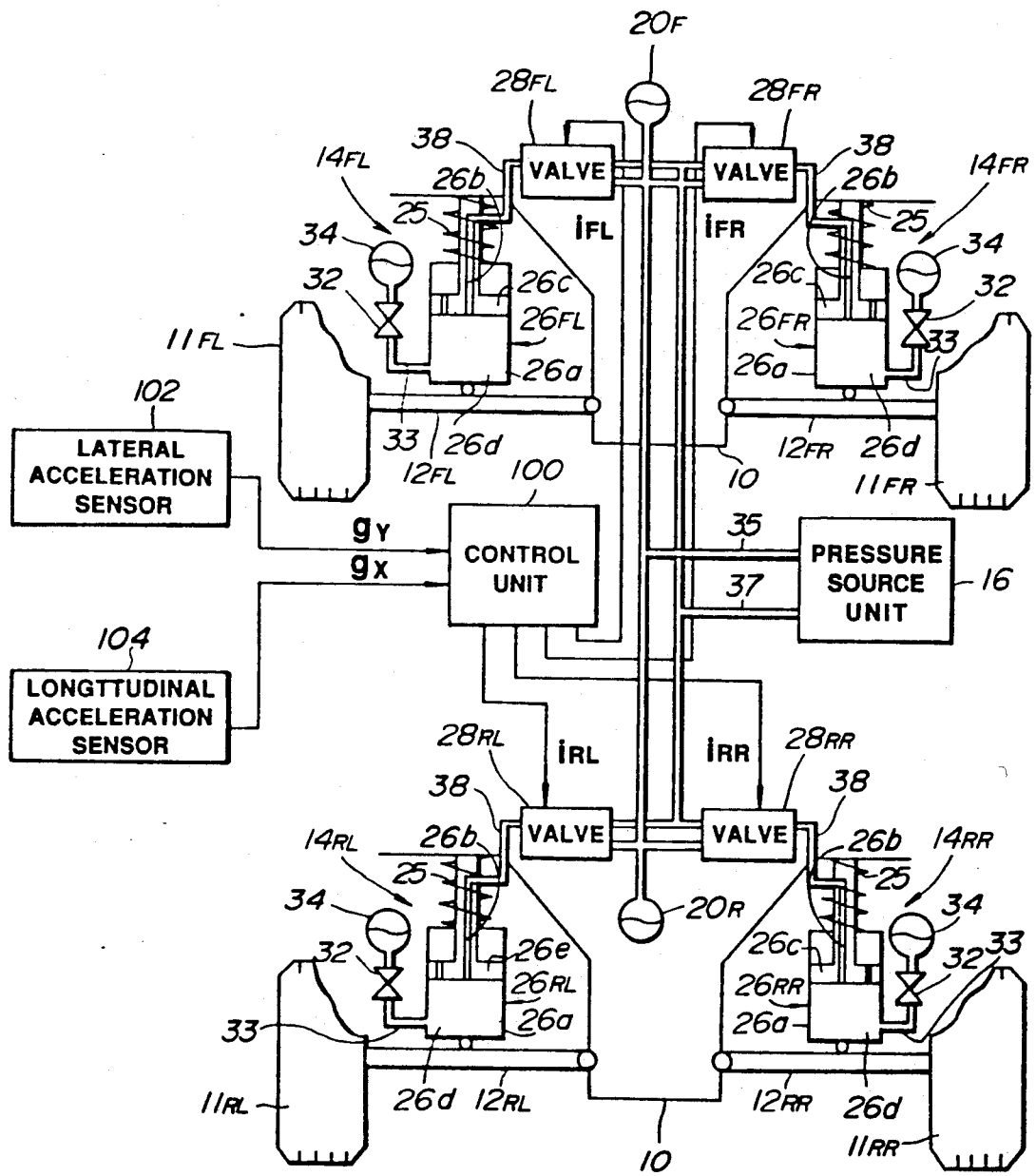
FIG. 1 is a diagrammatic illustration of the preferred embodiment of an active suspension system according to the present invention.

Referring now to the drawings, particularly to FIG. 1, the preferred embodiment of an active suspension system, according to the present invention, is designed to generally perform suspension control for regulating vehicular height level and vehicular attitude by suppressing relative displacement between a vehicular body 10 and suspension members $12_{FL}$, $12_{FR}$, $12_{RL}$ and $12_{RR}$ of front-left, front-right, rear-left and rear-right suspension mechanism $14_{FL}$, $14_{FR}$, $14_{FL}$ and $14_{RR}$ and rotatably supporting front-left, front-right, rear-left and rear-right wheels $11_{FL}$, $11_{FL}$, $11_{RL}$ and $11_{RR}$. The suspension mechanism as generally referred to will be hereafter represented by the reference numeral "14" Respective front-left, front-right, rear-left and rear-right suspension mechanisms $14_{FL}$, $14_{FR}$, $14_{FL}$ and $14_{RR}$ have hydraulic cylinders $26_{FL}$, $26_{FR}$, $26_{RL}$ and $26_{RR}$ which will be represented by the reference numeral "26" as generally referred to.

Each of the hydraulic cylinder 26 is disposed between the vehicular body 10 and the suspension member $12_{FL}$, $12_{FR}$, $12_{RL}$ and $12_{44}$ to produce a damping force for suppressing relative displacement between the vehicular body and the suspension member. The hydraulic cylinder 26 generally comprises an essentially enclosed cylindrical cylinder body 26a defining therein an enclosed chamber. A thrusting piston 26c is thrustingly and slidably disposed within the enclosed chamber of the hydraulic cylinder 26 for defining in the latter a working chamber 26d. The piston 26c is connected to the associated one of suspension member 12 via a piston rod 26b. A suspension coil spring 25 are also provided in respective of suspension mechanisms. However, in contrast to the normal or ordinary suspension systems, the suspension coil spring to be employed in the shown type of the suspension system is not required a resilient force in a magnitude required in the ordinary suspension system and only required the resilient force necessary for maintaining the vehicular body about the suspension member.

The working chamber 26d of the hydraulic cylinder 26 is connected to one of pressure control valves $28_{FL}$, $28_{FR}$, $28_{FL}$, $28_{FR}$ via a pressure control line 38. The presure control valves $28_{FL}$, $28_{FR}$, $28_{RL}$ and $28_{RR}$ will be hereafter represented by the reference numeral "28" as generally referred to. The pressure control valve 28 has a control port communicated with the working chamber 26d via the pressure control line 38. The pressure control valve 28 also has an inlet port and a drain port. The inlet port of the pressure control valve 28 is connected to o a pressure source unit 16 via a supply line 35, and the drain port 28r thereof is communicated with a drain line 37. The pressure control valve 28 incorporates a proportioning solenoid 28 for adjusting valve position according to magnitude of suspension control signal $I_{FL}$, $I_{FR}$, $I_{RL}$ and $I_{RR}$ supplied from the control unit 100. The suspension control signals $I_{FL}$, $I_{FR}$, $I_{RL}$ and $I_{RR}$ are current signals having a variable current value representative of commanding pressure in the working chamber. A branch circuit is provided for connecting the working chamber 26d to a pressure accumulator 34 via a flow path 33 and a flow restricting means, such as an orifice 32. This pressure accumulator 34 may be hereafter referred to as "low pressure accumulator". Another pressure accumulators 20F and 20R are provided in the supply line 35 for accumulating the excessive pressure generated in the pressure source unit 16.

The pressure control valves 28 comprise, though it is not clearly shown in FIG. 1, electrically or electromagnetically operable actuators, such as a proportioning solenoids. The hydraulic cylinder 26 and the pressure control valve 28 may be of any suitable constructions for adjusting damping characteristics with sufficiently high response. Typical constructions of the hydraulic cylinder 26 and the pressure control valve 28 have been disclosed in the following patents: U.S. Pat. No. 4,948,165, issued on Aug. 14, 1991; and U.S. Pat. No. 4,911,470, issued on Mar. 27, 1990.

The foregoing U.S. Patents are herein incorporated by reference for the sake of disclosure.

The pressure control valve 28 employed in the shown embodiment incorporates a proportioning solenoid 28e for adjusting valve position and thus adjusts control pressure to be supplied to the working chamber 26d of the associated one of the hydraulic cylinder 26. In practice, the pressure control valve employed in the shown embodiment is designed as pilot operated valve, in which the pilot pressure is adjusted by the position of the proportioning solenoid.

For adjusting control pressure at the control port 28c, the proportioning solenoid 28e is provided, a suspension control command, which is in a form of a current signal having a variable component depending upon the command value. The suspension control command is generated by a control unit 100. In order to perform, height regulation and attitude regulation for the vehicular body, the control unit 100 is connected to a plurality of sensors for monitoring various suspension control parameters. Parameters for performing suspension control and data processing for deriving the suspension control command values have been discussed in various co-pending applications set forth above. Amongst, the following disclosure may be concentrated for anti-rolling suspension control which may be combined with any other logic of suspension control.

Though the control may perform various controls, the following discussion will be concentrated to anti-rolling and anti-pitching control to be performed by the control unit 100. In order to do this, the control unit 100 is connected to a lateral acceleration sensor 102 and a longitudinal acceleration sensor 104. The lateral acceleration sensor 102 is designed to produce a lateral acceleration indicative signal $g_y$ representative of a magnitude of lateral acceleration exerted on the vehicular body 10. For enabling this, the lateral acceleration sensor 102 may be mounted on an appropriate position of the vehicular body. On the other hand, the longitudinal acceleration sensor 104 is designed to produce a longitudinal acceleration indicative signal $g_x$ representative of the longitudinal acceleration exerted on the vehicular body. Both of the lateral acceleration indicative signal $g_y$ and the longitudinal acceleration indicative signal $g_x$ are analog signals having voltage level variable depending upon the magnitude of the lateral and longitudinal acceleration exerted on the vehicular body.

Figure 3:
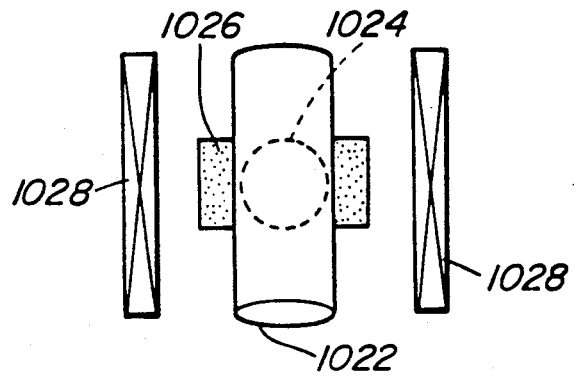
FIG. 3 is an illustration showing one example of an acceleration sensor to be employed in the preferred embodiment of the active suspension system according to the invention.

One example of the acceleration sensor which can be used as lateral and longitudinal acceleration sensors 102 and 104, is shown in FIG. 3. As seen from FIG. 3, the acceleration sensor comprises a cylindrical body 1022 formed of a magnetically conductive material, a steel ball 1024 disposed within the interior space of the cylindrical body, a permanent magnet 1026 provided outside of the cylindrical body and magnetically supporting the steel ball within the interior space of the cylindrical body, and a cylindrical detector coil 1028 surrounding the cylindrical body. One end of the detector coil 1028 is grounded via a resistor. The potential having an offset in a magnitude corresponding to a predetermined neutral value $Y_{GN}$ and $X_{GN}$, can be obtained at a junction between the detector coil 1028 and the grounding resistor. The cylindrical body 1022 is oriented on the appropriate position of the vehicular body with directing its axis in a direction about which the inertia force is to be measured. For instance, when the shown acceleration sensor is used as the lateral acceleration sensor, the axis of the cylindrical body 1022 is directed in horizontally transverse to the longitudinal axis of the vehicular body. Similarly, when the acceleration sensor is used for monitoring the longitudinal acceleration, the axis of the cylindrical body 1022 is directed in parallel relationship to the longitudinal axis. With this arrangement, the steel ball 1024 will subject inertia force in the direction to monitor to cause destruction of the magnetic field formed by the permanent magnet 1026. Magnitude of destruction may be variable depending upon the magnitude of the inertia force exerted on the steel ball 1026. Therefore, the potential at the junction between the detector coil 1028 and the grounding resistor. The potential at the junction is output as the sensor output. Therefore, the sensor output is variable from the neutral value $Y_{GN}$ and $X_{GN}$ depending upon the magnitude of inertia force and direction thereof.

The control unit 100 comprises analog-to-digital (A/D) converters 106Y and 106X to convert the analog form lateral and longitudinal acceleration indicative signals $g_y$ and $g_x$ into digital signals. The A/D converters 106Y and 106X feed digital form lateral and longitudinal acceleration indicative signals $g_y$ and $g_x$ to a microprocessor 110 which comprises an input/output interface 112, an arithmetic circuit 114 and a memory unit 116. The microprocessor 110 processes the lateral and longitudinal acceleration indicative signals $g_y$ and $g_x$ to produce front-left, front-right rear lift and rear-right suspension control commands $V_{FL}$, $V_{FR}$, $V_{RL}$ and $V_{RR}$ in forms of voltage signals having voltage level representative of required magnitude of control pressure Pc to be supplied from the pressure control valves $28_{FL}$, $28_{FR}$, $28_{RL}$ and $28_{RR}$ to respectively corresponding working chambers 26d of the hydraulic cylinders $26_{FL}$, $26_{FR}$, $26_{RL}$ and $25_{RR}$. The front-left, front-right-rear-left and rear-right suspension control commands $V_{FL}$, $V_{FR}$, $V_{RL}$ and $V_{RR}$ are converted into analog signals by digital-to-analog (D/A) converters $120_{FL}$, $120_{FR}$, $120_{RL}$ and $120_{RR}$. The D/A converted front-left, front-right-rear-left and rear-right suspension control commands $V_{FL}$, $V_{FR}$, $V_{RL}$ and $V_{RR}$ are supplied to driver circuits $122_{FL}$, $122_{FR}$, $122_{RL}$ and $122_{RL}$. The driver circuits $122_{FL}$, $122_{FR}$, $122_{RL}$ and $122_{RR}$ comprise current signal generator, such as floating type constant current generator, for producing current signal form front-left, front-right-rear-left and rear-right suspension control signals $I_{FL}$, $I_{FR}$, $I_{RL}$ and $I_{RR}$ having current value variable corresponding to the suspension control command values $V_{FL}$, $V_{FR}$, $V_{RL}$ and $V_{RR}$. The suspension control signals $I_{FL}$, $I_{FR}$, $I_{RL}$ and $I_{RR}$ are fed to proportioning solenoids of respectively corresponding pressure control valves $28_{FL}$, $28_{FR}$, $28_{RL}$ and $28_{RR}$ for controlling pilot pressure therein and whereby controlling the control pressure Pc to be supplied to the corresponding working chambers 26d.

Figure 2:
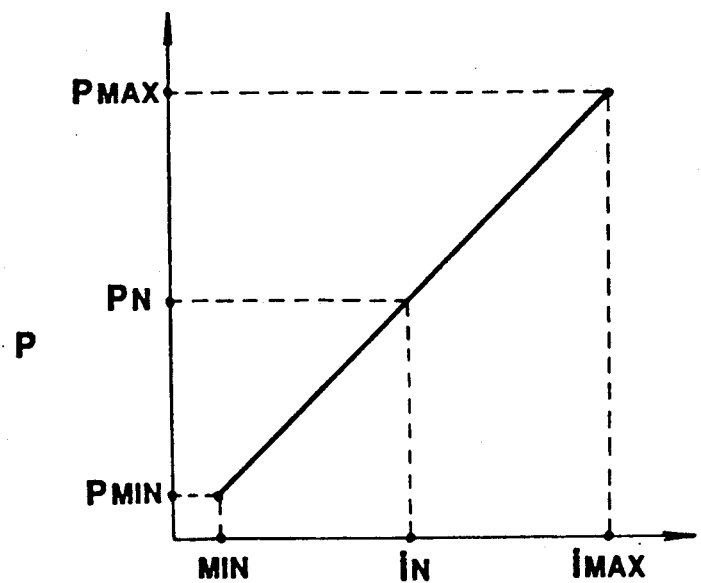
FIG. 2 is a chart showing variation of control pressure level Pc relative to current level of a suspension control signal i.
Figure 4:
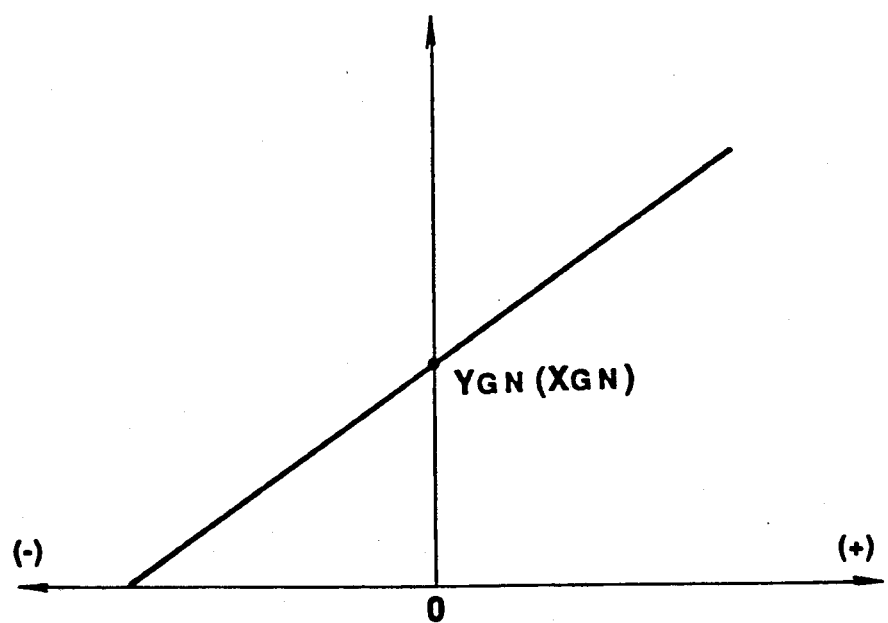
FIG. 4 is a chart showing variation of output level of acceleration sensor in relation to acceleration exerted on the vehicular body.

As shown in FIG. 2, the control pressure Pc to be supplied from the pressure control valve 28 to the working chamber 26d via the control line 38 is variable between a predetermined maximum pressure $P_{max}$ and a predetermined minimum pressure $P_{min}$ across a predetermined neutral pressure $P_N$ while the suspension control signal varies its current level between a predetermined maximum value $I_{max}$ and a predetermined minimum value $I_{min}$. The neutral pressure $P_N$ of the control pressure Pc is produced in response to the suspension control signal having a value $I_N$.

On the other hand, as seen from FIG. 3, the output levels of the lateral and longitudinal acceleration sensors 102 and 104 are variable according to the characteristics as illustrated. Namely, when the lateral or longitudinal acceleration exerted on the vehicular body is zero, the output level of the lateral or longitudinal acceleration sensor 102 and 104 is maintained at the predetermined neutral level $Y_{GN}$ or $X_{GN}$. In the shown embodiment, the lateral acceleration sensor 102 increases the output level from the neutral level $Y_{GN}$ in response to increasing lateral acceleration directed right. On the other hand, the lateral acceleration sensor 102 decreases the output level from the neutral level $Y_{GN}$ in response to increasing lateral acceleration directed left. Similarly, the longitudinal acceleration sensor 104.

The practical control operation to be taken place by the control unit 100 will be discussed with reference to FIGS. 6 and 7, in which are shown flowcharts of a anti-rolling and anti-pitching suspension control routines to be executed by the microprocessor 110. Each of the shown routines is programmed as an interrupt routine to be executed at every given timing.

Figure 6:
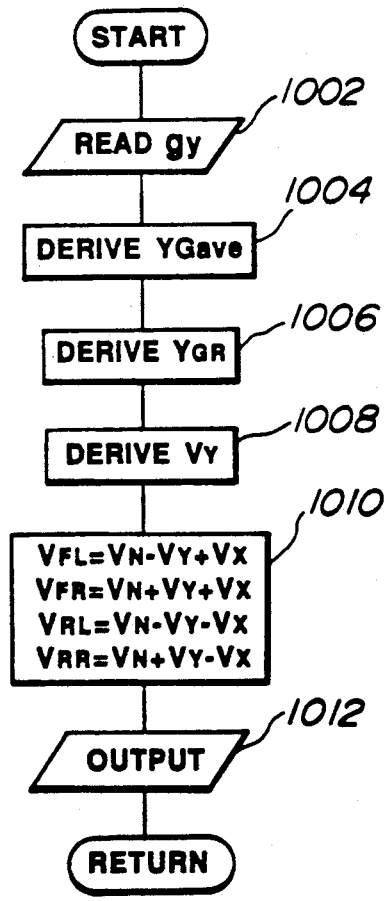
FIG. 6 is a flowchart showing anti-rolling suspension control routine to be executed by the preferred embodiment of the active suspension system according to the invention.

FIG. 6 shows the anti-rolling suspension control routine for detecting magnitude of vehicular rolling and deriving anti-rolling suspension control signal component $V_Y$. In the shown embodiment, the anti-rolling suspension control routine of FIG. 6 is executed every 2 msec. Immediately after starting execution, the lateral acceleration indicative signal $g_y$ is read out, at a step 1002. From the read lateral acceleration acceleration indicative signal value $g_y$, a running average $YG_{ave}$ is derived over a predetermined number of previously stored lateral acceleration indicative signal values. The running average $YG_{ave}$ of the lateral acceleration indicative signal values derived at the step 1004 will be hereafter referred to as an average lateral acceleration indicative data. In the shown embodiment, the average lateral acceleration indicative data $YG_{ave}$ is derived over thirteen (13) lateral acceleration indicative signal values including the current lateral acceleration indicative signal value. Practically, the manner of deriving the average lateral acceleration indicative data $YG_{ave}$ can be expressed by:

$$YG_{ave} \leftarrow YG_{ave}(old) + (y_{g-12} + y_{g-11} \cdots y_{g-1} + y_g)/13 \quad (1)$$

By deriving the running average over the preceding thirteen lateral acceleration indicative signal values, the overall period for averaging ($=2\times13=26$ msec) becomes substantially corresponding to one cycle of vibration frequency at the resonance point, e.g. approximately 38 Hz. As a result, the output value of the lateral acceleration sensor 102 can be significantly reduced. Furthermore, the averaging process at the step 1004 is also effective for removing any noise component which can become superimposed on the acceleration sensor output.

At at step 1006, a lateral acceleration data $Y_{GR}$ is derived by subtracting the neutral value $Y_{gN}$ from the average lateral acceleration indicative data $YG_{ave}$. Then, the anti-rolling suspension control signal components $V_Y$ is arithmetically derived on the basis of the lateral acceleration data $Y_{GR}$ at a step 1008. Practically, the anti-rolling suspension control signal component $V_Y$ is derived by multiplying the lateral acceleration data $Y_{GR}$ by a predetermined gain $K_Y$. Then, at a step 1010, the suspension control commands $V_{FL}$, $V_{FR}$, $V_{RL}$ and $V_{RR}$ are derived by the on the basis of the anti-rolling suspension control signal component $V_Y$, an anti-pitching suspension control component $V_X$ and a predetermined neutral value $V_N$ which corresponds to the neutral pressure $P_N$, by following equations:

$$V_{FL} = V_N - V_Y + V_X \quad (2)$$

$$V_{FR} = V_N + V_Y + V_X \quad (3)$$

$$V_{RL} = V_N - V_Y - V_X \quad (4)$$

$$V_{RR} = V_N + V_Y - V_X \quad (5)$$

The suspension control commands $V_{FL}$, $V_{FR}$, $V_{RL}$ and $V_{RR}$ thus derived are output at a step 1012.

Figure 7:
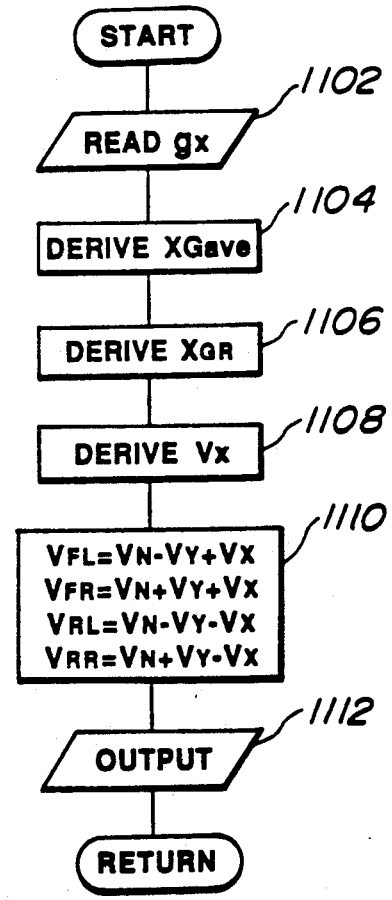
FIG. 7 is a flowchart showing anti-pitching suspension control routine to be executed by the preferred embodiment of the active suspension system according to the invention.
Figure 5:
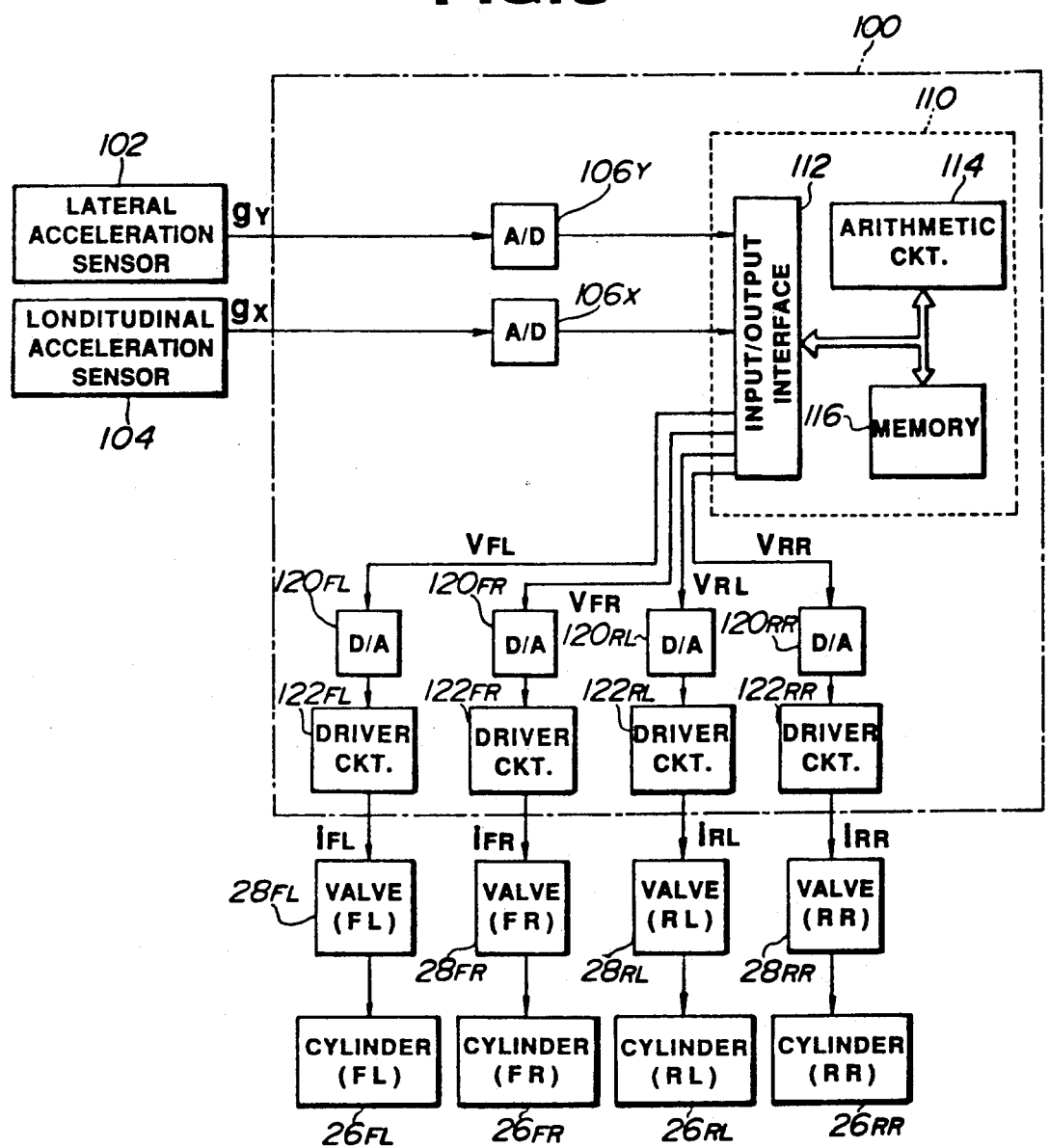
FIG. 5 is a block diagram of a suspension control system employed in the shown embodiment of the active suspension system according to the invention.

A similar process takes place for anti-pitching suspension control as illustrated in FIG. 7. As can be seen from FIG. 7, the process for performing the anti-pitching control is equivalent to the foregoing anti-rolling control. In the shown embodiment, the anti-pitching suspension control routine is executed every 5 msec.

Immediately after starting execution, the longitudinal acceleration indicative signals $g_y$ is read out, at a step 1102. From the read longitudinal acceleration indicative signal value $g_x$, a running average $XG_{ave}$ is derived over a predetermined number of previously stored longitudinal acceleration indicative signal values at a step 1104. The running average $XG_{ave}$ of the longitudinal acceleration indicative signal values derived at the step 1104 will be hereafter referred to as an average longitudinal acceleration indicative data. In the shown embodiment, the average longitudinal acceleration indicative data $XG_{ave}$ is derived over five (5) longitudinal acceleration indicative signal values including the current longitudinal acceleration indicative signal value. Practically, the manner of deriving the average longitudinal acceleration indicative data $XG_{ave}$ can be expressed by:

$$XG_{ave} = XG_{ave}(\text{old}) + (X_{g-4} + X_{g-3} \ldots X_{g-1} + X_g)/5 \quad (6)$$

By deriving the running average over the preceding five longitudinal acceleration indicative signal values, the overall period for averaging ($=5 \times 5 = 25$ msec) becomes substantially corresponding to one cycle of vibration frequency at the resonance point, e.g. approximately 38 Hz. As a result, the output value of the longitudinal acceleration sensor 104 can be significantly reduced. Furthermore, the averaging process at the step 1104 is also effective for removing noise component which can superimpose on the acceleration sensor output.

At step 1106, a longitudinal acceleration data $X_{GR}$ is derived by substracting the neutral value $X_{gN}$ from the average longitudinal acceleration indicative data $XG_{ave}$. Then, the anti-rolling suspension control signal components $V_X$ is arithmetically derived on the basis of the longitudinal acceleration data $X_{GR}$ at a step 1108. Practically, the anti-rolling suspension control signal component $V_X$ is derived by multiplying the longitudinal acceleration data $Y_{GR}$ by a predetermined gain $K_X$. Then, at a step 1110, the suspension control commands $V_{FL}$, $V_{FR}$, $V_{RL}$ and $V_{RR}$ are derived by the on the basis of the anti-rolling suspension control signal component $V_Y$, an anti-pitching suspension control component $V_X$ and a predetermined neutral value $V_N$ which corresponds to the neutral pressure $P_N$, by the foregoing equations (2), (3), (4) and (5). The suspension control commands $V_{FL}$, $V_{FR}$, $V_{RL}$ and $V_{RR}$ thus derived are output at a step 1112.

While the vehicle travels along a smooth straight road at constant speed, vehicular rolling and pitching will not be induced. Therefore, the lateral acceleration indicative signal $g_y$ and the longitudinal acceleration indicative signal $g_x$ are maintained substantially at the neutral values $g_N$. Therefore, the average lateral and longitudinal acceleration indicative data $YG_{ave}$ and $XG_{ave}$ derived at the steps 1004 and 1104 in the foregoing routines are maintained substantially at zero. Therefore, the suspension control command values $V_{FL}$, $V_{FR}$, $V_{RL}$ and $V_{RR}$ are substantially maintained at the neutral command value $V_N$. Therefore, the suspension control signals $I_{FL}$, $I_{FR}$, $I_{RL}$ and $I_{RR}$ have the current value $I_N$ corresponding to the neutral pressure $P_N$.

Assuming left-hand steering is performed, a left-hand inertia force is exerted on the vehicular body to cause vehicular rolling for lowering the vehicular height at the right side and lifting up the left side. Then, the lateral acceleration indicative signal value $g_y$ becomes greater than zero. At this condition, the longitudinal acceleration indicative signal $g_x$ is maintained zero. The anti-rolling suspension control component $V_Y$ is derived by multiplying the average lateral acceleration indicative data $YG_{ave}$ with the predetermined gain $K_Y$. In such case, the front-right and rear-right suspension control commands $V_{FR}$ and $V_{RR}$ are set greater than the front-left and rear-left suspension control commands $V_{FL}$ and $V_{RL}$. As a result, the fluid pressures in the working chambers 26d of the front-right and rear-right hydraulic cylinders $26_{FR}$ and $26_{RR}$ are increased for harder suspension characteristics. In contrast, the fluid pressures in the working chambers 26d of the front-left and rear-left hydraulic cylinders $26_{FL}$ and $26_{RL}$ are decreased for softer suspension characteristics. Therefore, lowering of the right side of the vehicular body can be suppressed by the hardened suspension characteristics of the front-right and rear-right suspension systems $14_{FR}$ and $14_{RR}$ and lifting up of the left side of the vehicular body can be suppressed by softer suspension characteristics of the front-left and rear-left suspension systems $14_{FL}$ and $14_{RL}$. Therefore, the vehicular attitude can be successfully regulated.

On the other hand, when right hand steering is made, the lateral acceleration indicative signal value $y_g$ becomes smaller than the neutral value $g_N$. Therefore, equivalent anti-rolling suspension control is performed for hardening left side suspension systems and softening right side suspension systems.

Similarly, when the vehicle is accelerated, the longitudinal acceleration indicative signal value $g_x$ is increased to be greater than the neutral value $g_N$. Therefore, the anti-pitching suspension control component $V_X$ is increased for obtaining harder suspension characteristics at the rear suspension systems 14RL and 14RR and softer suspension characteristics at the front suspension systems $14_{FL}$ and $14_{FR}$. By this, anti-pitch can be achieved.

When the vehicle travels on an undulating road, the vibration frequency exerted on the lateral and longitudinal acceleration sensors 102 and 104 can become matched to the resonance frequency of the acceleration sensors. Then, the lateral and longitudinal acceleration indicative signals $y_g$ and $g_x$ can become much greater than that should be because of resonance. In the shown embodiment, the average process is performed in a period Tr essentially corresponding to the resonating frequency cycle for deriving the average lateral and longitudinal acceleration indicative data $YG_{ave}$ and $XG_{ave}$. By this, the front half of the resonating peak can be canceled by the rear half of the resonating peak. As result, the average lateral and longitudinal acceleration indicative data $YG_{ave}$ and $XG_{ave}$ are maintained cross to the neutral values $Y_{GN}$ and $X_{GN}$. Therefore, influence of the resonance frequency of the acceleration sensor can be successfully avoided.

With the shown construction, since the influence of the resonance frequency can be avoided by utilizing the running average, it becomes unnecessary to use a gain lowering means, such as a band elimination filter and so forth. This permits reduction of the size of the control unit and simpler.

While the present invention has been discussed in terms of the preferred embodiment of the active suspension system, the invention can be embodied in various fashion. Therefore, the invention should be appreciated to include all possible embodiments and modifications which can be implemented without departing from the principle of the invention which is set out in the appended claims.

For instance, though the shown embodiment employs the running average for canceling the error component which can be contained in the acceleration sensor output, equivalent effect can be obtained by simply averaging given number of acceleration sensor outputs which are sampled from time to time. Furthermore, the number of acceleration sensor outputs to be averaged can be selected in any number as long as the averaging period can be maintained cross to the one cycle of the resonance frequency.

Furthermore, though the shown embodiment derives the anti-rolling and anti-pitching suspension control components by multiplying the lateral and longitudinal acceleration indicative data with a given gain, it should be possible to derive the anti-rolling and anti-pitching suspension control component by table look-up in terms of the lateral and longitudinal acceleration data. Furthermore, though the shown embodiment employs a digital circuit to form the control unit, the equivalent control operation can be achieved even by analog circuit.

In addition, though the foregoing discussion is concentrated to the active suspension system, the gist of the invention may also be applicable for passive type suspension control systems.

What is claimed is:

1. A suspension control system for a automotive vehicle, comprising:
    a plurality of suspension systems, each respectively disposed between a vehicular body and a road wheel for damping a relative displacement between said vehicular body and each respective road wheel, said suspension system having variable suspension characteristics depending upon a respective suspension control command;
    a sensor means, having a known resonance frequency, for monitoring an inertial force causing a vehicular attitude change on the vehicular body, to provide a sensor signal representative of the monitored magnitude of the inertial force;
    first means for modifying a value of said sensor signal for eliminating an error component induced therein by said known resonance frequency of said sensor means, to provide a modified sensor signal excluding said error component; and
    second means for receiving said modified sensor signal from said first means for deriving a suspension control command on the basis of said sensor signal modified by said first means.

2. A suspension control system as set forth in claim 1, wherein said sensor means monitors an acceleration experienced by the vehicular body.

3. A suspension control system as set forth in claim 2, wherein:
    said first means averages said sensor signals over a predetermined period related to said known resonance frequency of the sensor means for thereby deriving the modified sensor signal.

4. A suspension control system as set forth in claim 3, wherein:
    said averaging period substantially corresponds to one cycle of said known resonance frequency of the sensor means.

5. A suspension control system for an automotive vehicle, comprising:
    a plurality of suspension systems, each disposed between a vehicular body and road wheels thereof for damping a relative displacement between said vehicular body and each respective road wheel, said suspension systems having variable suspension characteristics depending upon a respective suspension control command;
    a sensor means, having a known resonance frequency, for monitoring an inertial force causing a vehicular attitude change on the vehicular body, to provide a sensor signal representative of the monitored magnitude of the inertial force, said sensor means being responsive to vibrations transmitted from a road surface corresponding to a resonance frequency of said sensor means to provide the sensor signal including a resonance frequency component;
    first means for averaging values of the sensor signal for a period of time substantially corresponding to at least one cycle of the resonance frequency to eliminate the resonance frequency component and providing a signal indicative of the averaged value; and
    second means responsive to the signal from said first means to provide said suspension control command.

6. A system as set forth in claim 5, wherein:
    said known resonance frequency of the sensor means is substantially equal to 38 Hz and the sensor means monitors a lateral acceleration acting on the vehicle body, with said first means sampling values of the monitored lateral acceleration substantially every 2 msec. for 13 cycles to provide a corresponding averaged value of lateral acceleration.

7. A system as set forth in claim 5, wherein:
    said sensor means monitors a longitudinal acceleration acting on the vehicle body, said first means sampling values of the monitored longitudinal acceleration substantially every 5 msec. for 5 cycles to provide a corresponding averaged value of longitudinal acceleration.

* * * * *